United States Patent [19]

Mitani et al.

[11] Patent Number: 5,544,529
[45] Date of Patent: Aug. 13, 1996

[54] PRESSURE SENSOR AND CHIP THEREFOR

[75] Inventors: Tateki Mitani; Motomi Ichihashi; Mikio Bessho, all of Himeji, Japan

[73] Assignee: Mitsubishi Denki Kabushiki Kaisha, Tokyo, Japan

[21] Appl. No.: 320,741

[22] Filed: Oct. 11, 1994

[30] Foreign Application Priority Data

Oct. 8, 1993 [JP] Japan ................................. 5-253151

[51] Int. Cl.⁶ .......................... G01L 13/02; G01L 15/00; G01L 9/06
[52] U.S. Cl. ................................ 73/716; 73/721; 73/727; 73/754
[58] Field of Search .................... 73/716, 754, 721, 73/727

[56] References Cited

U.S. PATENT DOCUMENTS

| | | | |
|---|---|---|---|
| 4,320,664 | 3/1982 | Rehn et al. | 73/708 |
| 4,322,980 | 4/1982 | Suzuki et al. | 73/727 |
| 4,528,855 | 7/1985 | Singh | 73/721 |
| 4,576,052 | 3/1986 | Sugiyama | 73/862.63 |
| 4,765,188 | 8/1988 | Krechmery et al. | 73/708 |
| 4,850,227 | 7/1989 | Luettgen et al. | 73/708 |

FOREIGN PATENT DOCUMENTS

| | | | |
|---|---|---|---|
| 2746105 | 5/1978 | Germany . | |
| 3839864 | 6/1989 | Germany . | |
| 4227893 | 4/1993 | Germany | 73/716 |
| 61-205832 | 9/1986 | Japan | G01L 7/00 |
| 62-44638 | 2/1987 | Japan | 73/716 |
| 68-151833 | 6/1988 | Japan | 73/754 |
| 0177271 | 7/1989 | Japan | 73/754 |
| 0073161 | 3/1990 | Japan | 73/754 |
| 3-67139 | 3/1991 | Japan | 73/720 |
| 3-199653 | 8/1991 | Japan | F02D 45/00 |
| 5-11039 | 2/1993 | Japan | G01L 9/04 |

Primary Examiner—Richard Chilcot
Assistant Examiner—Paul D. Amrozowicz
Attorney, Agent, or Firm—Sughrue, Mion, Zinn, Macpeak & Seas

[57] ABSTRACT

A pressure sensor is capable of detecting a certain pressure and an atmospheric pressure individually and independently in real time, with miniaturization and light weight. This is attained by providing a pressure sensor comprising a first pressure sensor; and an atmospheric pressure sensor. Each sensor includes a pressure-sensitive element and a circuit for amplifying an output signal from the pressure-sensitive element. The amplifying circuit for the first pressure sensor, and the pressure-sensitive element and the amplifying circuit for the atmospheric pressure sensor are provided on the same chip. The amplifying circuit compensates for nonuniformity in characteristics of the pressure-sensitive element due to temperatures.

5 Claims, 5 Drawing Sheets

PRESSURE SENSOR AND CHIP THEREFOR

BACKGROUND OF THE INVENTION

1. Field of the Invention

The present invention relates to a pressure sensor for measuring various kinds of pressure and atmospheric pressure which are input signals to be utilized mainly in various control for a vehicle, and a chip therefor.

2. Discussion of Background

As an example of conventional pressure sensors is known the one which is disclosed in Japanese Unexamined Patent Publication No. 199653/1991. The pressure sensor and its surroundings in the publication is shown in FIG. 7.

In FIG. 7, reference numeral 1 designates an intake pipe, reference numeral 2 designates an injector for injecting fuel, reference numeral 3 designates a throttle valve which operates according to the degree to which a driver pushes an accelerator, pedal, reference numeral 4 designates a pressure sensor, reference numeral 5 designates a computer, reference numeral 6 designates a three port solenoid valve which directs the pressure in the intake pipe 1 or an atmospheric pressure to the pressure sensor 4 by performing a switching operation in accordance with a command from the computer 5, and reference numeral 7 designates an engine.

FIGS. 8(a) and 8(b) are schematic views showing essential parts in the pressure sensor 4, and FIG. 9 is a diagram showing an electric equivalent circuit in the pressure sensor. In those Figures, reference numeral 8 designates a pressure-sensitive element wherein resistors 10 are provided in a Wheatstone bridge arrangement on a diaphragm 9 which is made from thin silicon semiconductor. In the pressure-sensitive element 8, the diaphragm 9 is deformed by a pressure medium introduced through a nipple 11 to change the resistance value of the resistor 10, and an output signal which is proportional to a pressure from the pressure medium is fed to the computer from an output terminal.

The circuit which is shown in FIGS. 8(a) and 8(b), and FIG. 9 will be explained in more detail. Reference numeral 12 designates a hybrid integrated circuit wherein thick film resistors (not shown) are formed on e.g. an alumina substrate 13 by printing. The integrated circuit 12 has chip capacitors 14 mounted thereinto, and has other devices arranged therein, the other devices including e.g. an integrated circuit chip 16 which has e.g. operational amplifiers 15 built therein to amplify a signal from the pressure-sensitive element 8 and to perform temperature compensation. Reference numerals 17 and 18 designate temperature compensating adjustment circuits.

The pressure-sensitive element 8, the hybrid integrated circuit 12 and others are provided in the pressure sensor 4 in that manner.

Now, the operation of the device shown in FIG. 7 will be explained.

External air is taken into through an air cleaner, not shown, and the air is introduced into the engine 7 through the intake pipe 1 and an intake manifold. The injector 2 injects fuel into the intake manifold, and compression and combustion are carried out in the engine 7 to obtain a power source for the internal engine. The amount of fuel injected from the injector 2 is calculated in the computer 5, depending on the amount of air taken from the intake pipe 1 and other operational information. The computer 5 has various operational factors input thereinto. In the operational factors is involved a pressure in the intake pipe 1 and an atmospheric pressure. The pressure in the intake pipe and the atmospheric pressure is measured by the same pressure sensor 4. Since both pressures can not be measured at the same time, the three port solenoid valve 6 is arranged in a tube through which a gas to be measured is directed to the pressure sensor 4. By switching the valve 6, both pressures can be measured respectively. In the device disclosed in the Japanese Unexamined Patent Publication, when the throttle valve 3 is fully closed on deceleration, the three port solenoid valve 6 is switched to introduce atmosphere into the pressure sensor 4. In this way, the pressure in the intake pipe and an atmospheric pressure are measured by the single pressure sensor 4.

The pressure sensor 4 is constituted mainly by the pressure-sensitive element 8 and the hybrid integrated circuit 12. When a pressure P arrives at the diaphragm 9 of the pressure-sensitive element 8 through the nipple 11 and deforms the diaphragm, changes in the values of the resistance in the four resistors 10 which are provided on the diaphragm 9 in the Wheatstone bridge arrangement appear. A signal caused by the change in the values of resistance is amplified by the operational amplifiers 15, is compensated in the temperature compensation circuits 17 and 18, and is fed to the computer 5 as an analog output which is accurately proportional to the pressure P.

Another example of the conventional devices is the system which is disclosed in Japanese Unexamined Patent Publication No. 205832/1986, and which reads a pressure in an intake pipe by a pressure sensor at specific operating conditions without a three port solenoid valve, and subjects the read pressure to compensatory calculation to see an approximate atmospheric pressure.

Another example is a system which measures an atmospheric pressure by a pressure sensor for measuring a pressure in an intake pipe before cranking just after an ignition switch is turned on.

In addition, there is an example wherein a pressure sensor for an intake pressure and an atmospheric pressure sensor are individually provided.

The conventional pressure measuring systems as stated earlier create the following problems:

Specifically, in the one shown in FIG. 7, although it is enough to provide the single pressure sensor, the three port solenoid valve 6 is required to selectively introduce the pressure in the intake pipe and external air into the single pressure sensor. As a result, the pressure measuring system including piping gets large, which is against space savings and involves high cost.

The one disclosed in Japanese Unexamined Patent Publication No. 205832/1986 could not obtain atmospheric pressure information when the information is required. It can not obtain accurate atmospheric pressure information either because the obtained atmospheric pressure is approximate value. This arrangement creates a problem in that it is impossible to carry out fine control.

The system which measures an atmospheric pressure before cranking involves a problem in that the atmospheric pressure can not be always measured at every operation mode before cranking after turning on the ignition switch (because resetting an IC is required at some operation modes).

The arrangement wherein the pressure sensor for a pressure in the intake pipe and the atmospheric pressure sensor are individually provided creates a problem in that cost rises necessarily.

SUMMARY OF THE INVENTION

It is an object of the present invention to solve the problems as mentioned above, and to provide a pressure sensor capable of detecting a certain pressure and an atmospheric pressure individually and independently in real time when information on those pressures is required, and of realizing miniaturization and light weight.

The foregoing and other objects of the present invention have been attained by providing a pressure sensor comprising a first pressure sensor; and an atmospheric pressure sensor; each sensor including a pressure-sensitive element and a circuit for amplifying an output signal from the pressure-sensitive element; at least the amplifying circuit in the first pressure sensor, and at least the pressure-sensitive element and the amplifying circuit in the atmospheric pressure sensor provided on the same chip.

It is preferable that the amplifying circuit has a function to compensate nonuniformity in characteristics of the pressure-sensitive element due to temperatures.

It is also preferable that the pressure sensor further includes a substrate, that the substrate has a temperature compensating adjustment element for compensating outside of the chip nonuniformity in characteristics of the pressure-sensitive element due to temperatures, and that the substrate and the chip have a member interposed therebetween to restrain the influence of heat transfer to the chip.

The objects of the present invention have also been attained by providing a chip for a pressure sensor, including thereon; a first circuit for amplifying an output signal corresponding to a certain detected pressure; a pressure-sensitive element for detecting an atmospheric pressure; and a second circuit for amplifying an output signal from the pressure-sensitive element.

The invention is basically characterized in that the circuit for amplifying an output signal corresponding to a detected first pressure, the pressure-sensitive element for detecting an atmospheric pressure, and the circuit for amplifying an output signal from the pressure-sensitive element are provided on the same chip. This arrangement can measure both certain pressure and atmospheric pressure at the same time and accurately in an inexpensive manner without making the pressure sensor large.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Now, the present invention will be described in detail in reference to preferred embodiments.

EMBODIMENT 1

Figure 1:
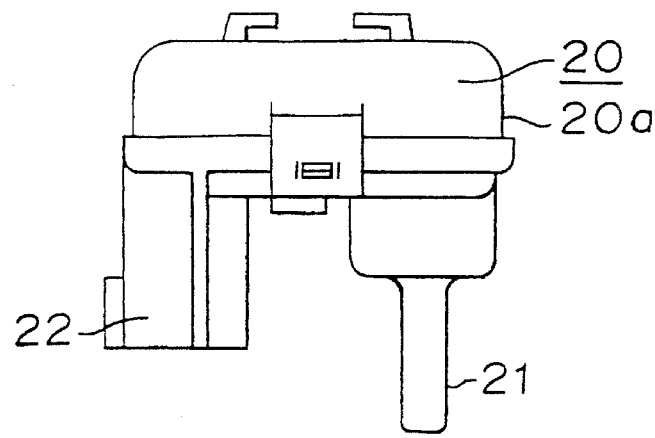
FIG. 1 is a front view showing the pressure sensor according to a first embodiment of the present invention.
Figure 2:
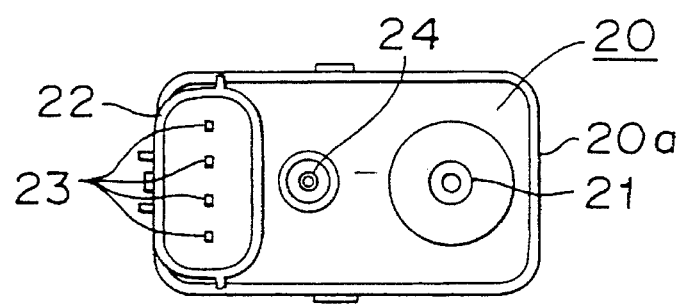
FIG. 2 is a bottom view of the pressure sensor.

Referring now to FIGS. 1 and 2, there is shown the pressure sensor according to a first embodiment of the present invention. FIG. 1 is a front view of the pressure sensor, and FIG. 2 is a bottom view of the pressure sensor.

In those Figures, reference numeral 20a designates a casing which forms the pressure sensor 20. The casing 20a has a sensor for detecting a certain pressure such as a pressure in an intake pipe, and a sensor for detecting an atmospheric pressure individually arranged therein.

Reference numeral 21 designates a nipple for introducing the pressure in the intake pipe or the like. Reference numeral 22 designates a connector which is used to connect to a computer as stated in reference to the conventional device, and reference numeral 23 designates terminals in the connector.

Reference numeral 24 designates an external air introducing aperture which introduces external air to the atmospheric pressure sensor in the casing 20a.

Figure 3:
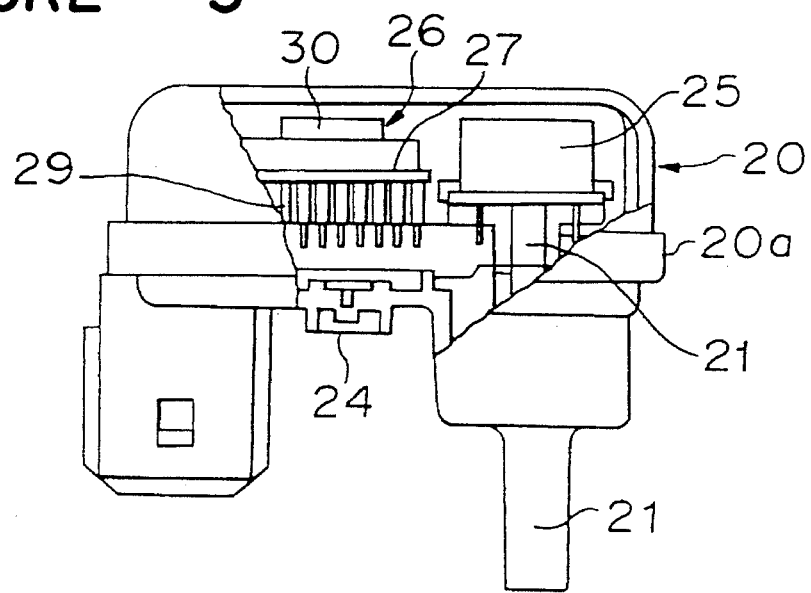
FIG. 3 is a front view showing the pressure sensor partially in section.

FIG. 3 is a partially sectional view showing the inside of the pressure sensor 20. Reference numeral 25 designates a pressure-sensitive element which detects e.g. a pressure in the intake pipe. Reference numeral 26 designates the atmospheric pressure sensor. Reference numeral 27 designates a hybrid integrated circuit (HIC) portion.

The pressure sensor 20 has the nipple 21 connected to an intake system of an engine through a pipe, and the external air introducing aperture 24 opened to atmosphere.

Figure 4A:
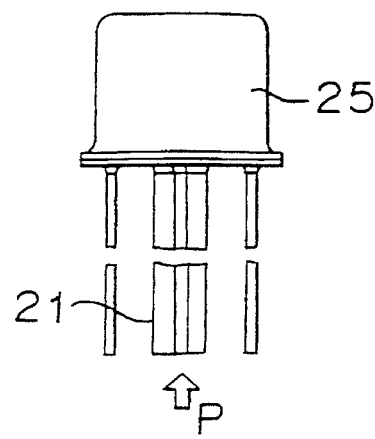
FIGS. 4(a)–(d) are views showing portions of the pressure sensor, FIG. 4(a) being a side view showing a first pressure-sensitive element, FIG. 4(b) being a plan view of a hybrid integrated circuit portion, FIG. 4(c) being a cross sectional view of the hybrid integrated circuit portion, and FIG. 4(d) being a schematic view showing a diaphragm and its vicinities in an atmospheric pressure sensor in enlargement.

FIGS. 4(a)–(d) are views which independently show essential portions forming the pressure sensor 20 shown in FIG. 3. Referring now to FIG. 4(a), there is shown the pressure-sensitive element 25 which forms a sensor for an intake pressure as an example of a first pressure sensor according to the present invention. The pressure-sensitive element 25 has such a structure that a pressure medium is transmitted to a diaphragm as an inner pressure-sensitive element through the nipple 21 from the direction indicated by an arrow P.

Figure 4B:
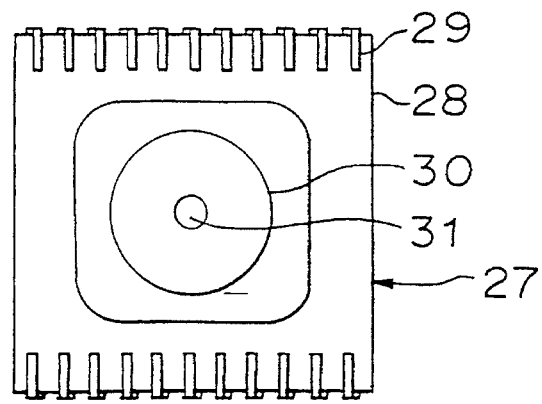

Referring now to FIG. 4(b), there is shown the hybrid integrated circuit portion 27 with the atmospheric pressure sensor 26 included therein. The hybrid integrated circuit portion 27 is constituted by e.g. an alumina substrate 28 with thick film resistors and a pattern (wiring), not shown, numbers of terminals 29 on sides of the alumina substrate 28, and a cap 30 covering a composite integrated circuit chip stated later.

The cap 30 has an external air introducing opening 31 formed in the top thereof to introduce external air into inside.

Figure 4C:
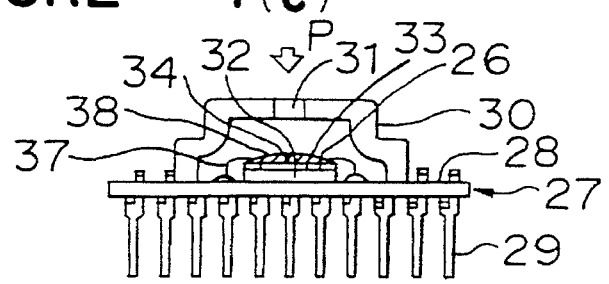

Referring now to FIG. 4(c) showing a cross sectional view of the hybrid integrated circuit portion shown in FIG. 4(b), there is shown the composite integrated circuit chip 33 as one of the main features of the present invention which is placed on the alumina substrate 28 through a seat 32. The seat 32 is made from glass or the like, and prevents thermal influence from being transmitted from the alumina substrate 28 to the composite integrated circuit chip 33.

The composite integrated circuit chip 33 includes the diaphragm 34 which is a pressure-sensitive element for detecting an atmospheric pressure. The composite integrated circuit chip has an electronic circuit arranged therein to include e.g. bridge resistors which detect an atmospheric pressure received by the diaphragm 34 and make the values of sensitance unbalanced depending on the magnitude of the atmospheric pressure, an operational amplifier (hereinbelow, referred to as "OP-amp") which amplifies a voltage indicative of an output signal in response to the unbalance in the values in sensitance, and which performs temperature compensation, and an OP-amp which amplifies a voltage generated by a pressure indicative of an operation state (a pressure detected by the first pressure sensor), and which performs temperature compensation.

The composite integrated circuit chip 33 is bonded to the seat 32 by way of e.g. anodic bonding (a high voltage and a high temperature are applied to bond the composite integrated circuit chip 33 made from silicone as conductive material and the seat 32 made of glass as insulating material).

The seat 32 and the alumina substrate 28 are bonded together by e.g. an adhesive.

Figure 4D:
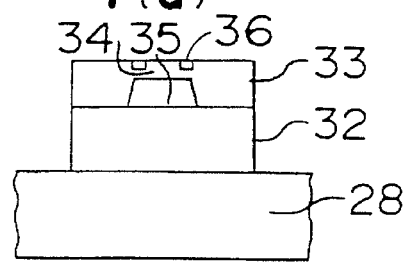

The composite integrated circuit chip 33 and the diaphragm 34 are arranged in such a state that is shown in enlargement in FIG. 4(d). Between the composite integrated circuit chip 33 and the seat 32 is formed a hollow space 35. The inside of the hollow space 35 is vacuum, which means that a pressure applied to the diaphragm 34 is indicated as an absolute pressure.

The composite integrated circuit chip 33 has resistors 36 formed thereon in a Wheatstone bridge arrangement by way of e.g. diffusion.

Referring now back to FIG. 4(c), reference numeral 37 designates one of the wires, which electrically connect the composite integrated circuit chip 33 to pads (not shown) of the alumina substrate 28. Reference numeral 38 designates a gel which protects the chip 33. Those members are covered by the cap 30.

Figure 5:
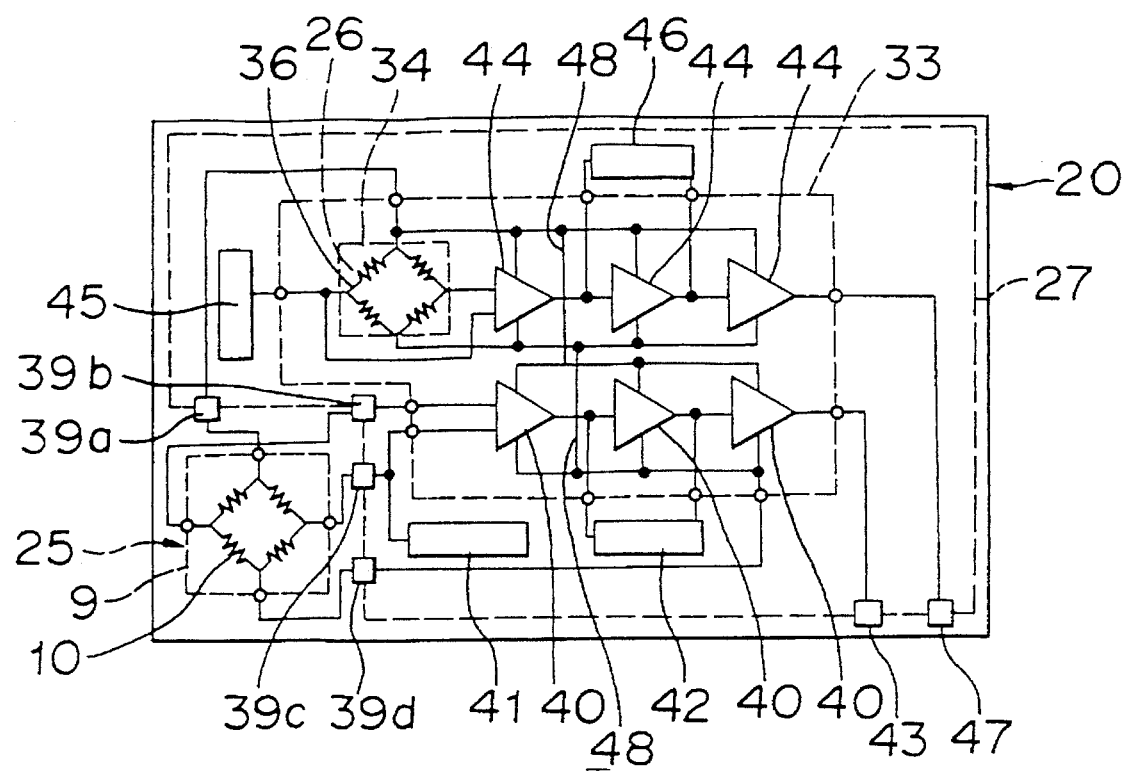
FIG. 5 is a diagram showing a circuit of the pressure sensor.

Referring now to FIG. 5, there is shown an electrical circuit such as the hybrid integrated circuit portion 27.

A diaphragm 9 as a pressure-sensitive member which forms the pressure-sensitive element 25 for the first pressure sensor has resistors 10 formed thereon in a Wheatstone bridge arrangement. The resistors are connected to terminals 39a–39d of the hybrid integrated circuit portion 27. The terminals 39a and 39d have power supplied from the computer outside the circuit, and a voltage of 5 V is normally applied across both terminals. In other words, the terminal 39a is at 5 V, and the terminal 39d is grounded to be at 0 V.

In the hybrid integrated circuit portion 27 are arranged three OP-amps 40 which amplify a voltage as an output signal generated in response to imbalance in the values of resistance in the resistors 10, and which perform temperature compensation. The terminals 39b and 39c are connected to an input end of the series of OP-amps 40. The OP-amps 40 are provided with temperature compensating resistors which compensate variation in sensitivity (span) due to temperatures, which is caused by the structure or the manufacturing method of the diaphragm 9. In this manner, the OP-amps 40 have a temperature compensating function as well.

On the other hand, to the OP-amps 40 and the resistors 10 are connected a temperature compensating adjustment circuit 41, which is used to adjust e.g. temperature drift in offset caused by variations in the diaphragm 9 of every product (pressure sensor). Because the offset varies from a product to another according to temperatures, adjustment by the temperature compensating adjustment circuit 41 is made in every product. This adjustment is made by trimming a thick film resistor (not shown) in the hybrid integrated circuit portion 27 on the alumina substrate 28 to change the value of resistance in the resistor. That is to say, the temperature compensating adjustment circuit 41 is constituted by the thick film resistor.

To the OP-amps 40 at the second and third stages is connected a temperature compensating adjustment circuit 42. The circuit 42 is for correcting variations in the sensitivity due to temperatures from outside of the OP-amps, and is constructed like the temperature compensating adjustment circuit 41.

To an output end of the OP-amps 40 in series is connected an output terminal 43, through which a voltage corresponding to an intake pressure or the like detected by the diaphragm is output to the computer.

Between the terminals 39a and 39d, and between input lines of the OP-amp 40 at the first stage are arranged chip capacitors as explained in reference to the conventional device though not shown.

On the other hand, to the bridge resistors 36 on the diaphragm 34 for measuring an atmospheric pressure are connected three OP-amps 44. The OP-amps 44 amplify a voltage as an output signal corresponding to imbalance in the values in resistance in the resistors 36 like the OP-amps 40, and perform temperature compensation. To the resistors 36 is connected a temperature compensating adjustment circuit 45, and to the OP-amps 44 at the second and third stages are connected a temperature compensating adjustment circuit 46. The temperature compensating adjustment circuit 45 adjusts offset like the temperature compensating adjustment circuit 41, and the temperature compensating adjustment circuit 46 adjusts sensitivity like the temperature compensating adjustment circuit 42. The structure of the circuits 45 and 46 is like that of the circuits 41 and 42.

To the OP-amps 44 in series is connected an output terminal 47. To the circuit for measuring an atmospheric pressure is applied a voltage across the terminals 39a and 39d, e.g. 5 V from the computer and 0 V as the grounded voltage. A line 48 electrically connects both sensors. As a result, both sensors can be activated by a single power source.

In accordance with the present invention, the diaphragm 34, the resistors 36 and the OP-amps 44 for measuring an atmospheric pressure, the OP-amps 40 for measuring e.g. an intake pressure as the first pressure, and the temperature compensating adjustment circuits 41, 42, 45 and 46 are arranged on the same hybrid integrated circuit portion 27 on the alumina substrate 28. Among those elements, the elements other than the temperature compensating adjustment circuits 41, 42, 45 and 46 are provided on the same chip, i.e. the composite integrated circuit chip 33. This arrangement allows a part of the sensor for measuring a certain pressure and an atmospheric pressure sensor to be provided on a single chip, thereby realizing miniaturization of the device. The reason why the diaphragm 9 and the resistors 10 for the intake pressure or the like are arranged outside of the hybrid integrated circuit portion 27 is that the diaphragm and the other circuits can not withstand contaminants or the like in an object to be measured. If this problem can be overcome, those elements can be provided on the same chip as well. The reason why the temperature compensating adjustment circuits 41, 42, 45 and 46 are not provided on the composite integrated circuit chip 33 is that those temperature compensating adjustment circuits are constructed so that the thick film resistors on the alumina substrate 28 are trimmed to compensate temperature drift or the like in offset according to the characteristics of the diaphragm in a finished product. If the temperature compensating adjustment circuits are constructed so that thin film resistors can be trimmed, the temperature compensating adjustment circuits can be provided on the same chip, i.e. the composite integrated circuit chip 33.

Now, the operation of the pressure sensor as stated earlier will be explained. A pressure medium in e.g. the intake pipe is transferred to the diaphragm 9 through the nipple 21 of the pressure sensor 20, resulting imbalance in the values of resistance in the bridged resistors 10 to create according to the detected pressure. A voltage caused by such imbalance is amplified and is subjected to temperature compensation by the OP-amps 40, and is also subjected to temperature compensation by the temperature compensating adjustment circuits 41 and 42. After that, it is forwarded from the first terminal 43 to the computer as stated with reference to the conventional device.

The computer performs operations on the valve timing or the time period for an injector based on the value of the pressure in the intake pipe, the revolution of the engine or the like. Fuel is injected from the injector into the intake pipe or the like in the amount corresponding to the result of the operations.

There is case wherein an atmospheric pressure is also referred to e.g. when the computer performs operations on the amount of fuel. For these reasons, external air is introduced through the external air introducing aperture 24 of the pressure sensor 20. The external air reaches the diaphragm 34 for measuring an atmospheric pressure through the external air introducing opening 31 in the cap 30 on the alumina substrate 28. The diaphragm 34 is deformed depending on the pressure of the introduced external air, thereby the values in resistance in the bridged resistors 36 to get imbalanced. A voltage proportional to the imbalance is amplified and is subjected to temperature compensation by the OP-amps 44, and is also subjected to the temperature compensation by the temperature compensating adjustment circuits 45 and 46. Then, it arrives at the output terminal 47, and is forwarded to the computer. According to the value corresponding to the external air pressure is corrected the fuel injection amount or the like.

EMBODIMENT 2

A second embodiment and its following embodiments are submitted to explain that the pressure sensor according to the present invention can be applied to a portion other than the intake system.

Although explanation on the first embodiment has been made with reference to the pressure sensor which can measure a pressure in the intake pipe and an atmospheric pressure at the same time, the pressure sensor can be applied to a case wherein a pressure in a fuel tank and an atmospheric pressure are simultaneously measured.

Figure 6:
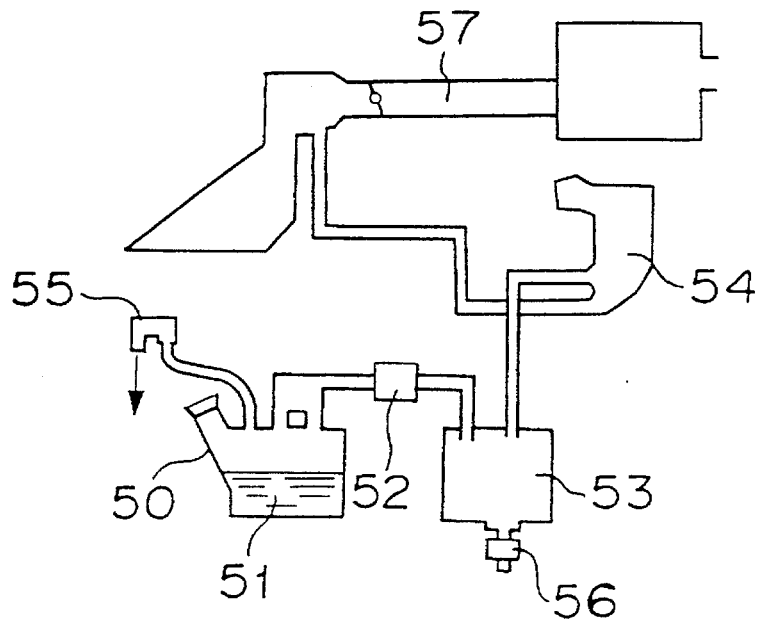
FIG. 6 is a schematic view of the system according to a second embodiment of the present invention, showing how a pressure sensor is applied to a fuel tank.
Figure 7:
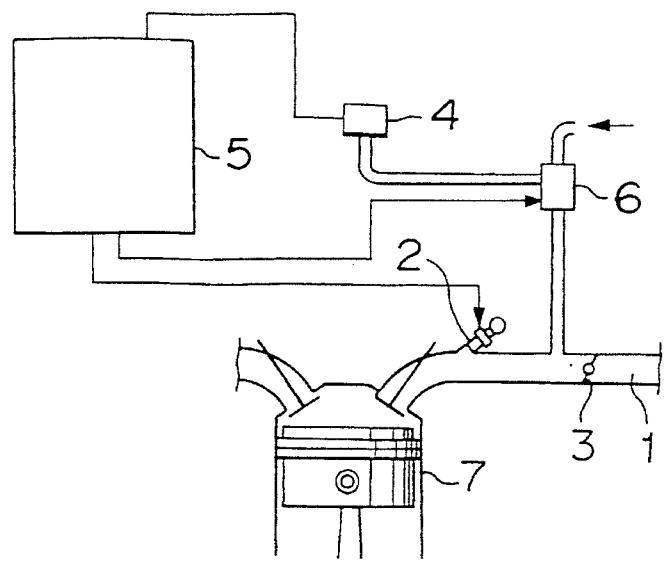
FIG. 7 is a schematic view to explain how a conventional pressure sensor is used.
Figure 8A:
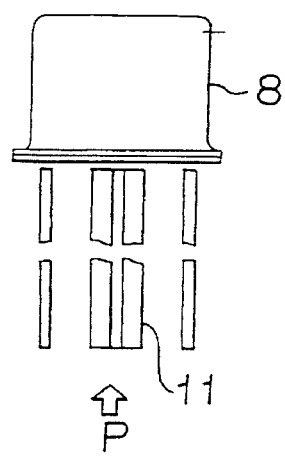
FIGS. 8(a) and (b) are views showing the conventional pressure sensor, FIG. 8(a) being a side view showing a pressure-sensitive element in it, and FIG. 8(b) being a perspective view showing a hybrid integrated circuit in it.
Figure 8B:
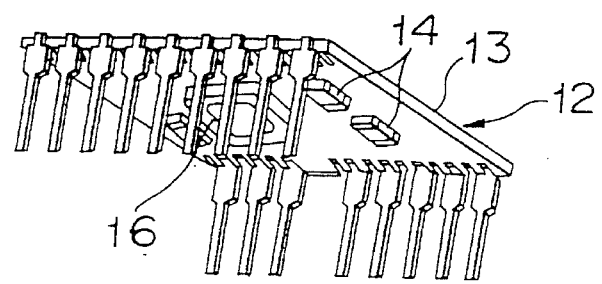
Figure 9:
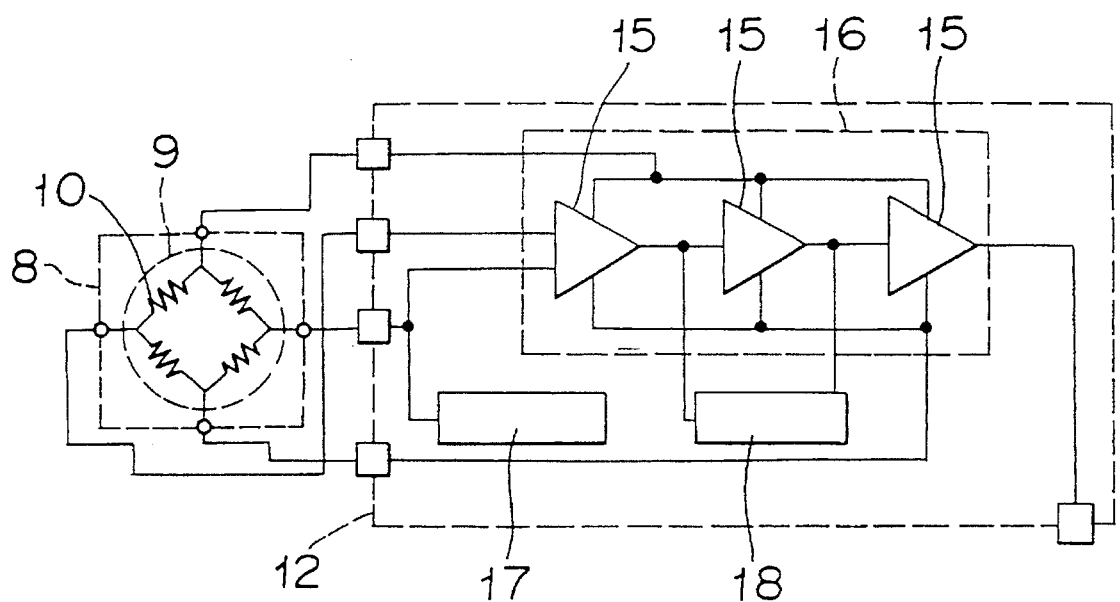
FIG. 9 is a diagram showing a circuit of the conventional pressure sensor°

This case is shown in FIG. 6.

In FIG. 6, reference numeral 50 designates the fuel tank which stores a fuel 51. Reference numeral 52 designates a check valve which is opened and closed depending on a pressure in the fuel tank 50. Reference numeral 53 designates a canister which normally houses activated carbon. Reference numeral 54 designates a purge control valve which is opened and closed to control the enter of an evaporated gas of the fuel 51 into an intake pipe 57 leading to an engine.

Reference numeral 55 designates a pressure sensor which can measure the evaporated pressure of the fuel in the fuel tank 50 and an atmospheric pressure at the same time, which is identical to the pressure sensor shown in the first embodiment in terms of basic portions in its appearance and inner circuits, and which is different from the one of the first embodiment in terms of inner material, characteristics or the like. Reference numeral 56 designates a solenoid valve which opens and closes when the evaporated gas (gasoline) in the canister 53 is opened to atmosphere.

The difference in the characteristics and the inner material of the pressure sensor 55 means that material and a structure are required to be chosen in order for a pressure-sensitive element to have gasoline resistance because, in the second embodiment, a pressure medium is an evaporated fuel (e.g. gasoline) and the evaporated fuel gets in direct contact with a portion of the pressure-sensitive element, that the pressure sensor has to have characteristics appropriate to measure a gauge pressure because when a pressure in the fuel tank is measured, a difference between it and an external air pressure, i.e. a gauge pressure, not an absolute pressure, is required to be measured in a system, and that detection sensitivity is increased because a gas pressure is low.

Now, the operation will be explained.

When an ambient temperature rises, the fuel 51 in the fuel tank 50 evaporates to become an evaporated gas. The evaporated gas of the fuel reaches the check valve 52, which inhibits the gas from flowing through when closing. When the pressure in the fuel tank 50 goes up beyond a certain level, the check valve 52 is opened, allowing the evaporated gas to flow into activated carbon (not shown) in the canister 53. The evaporated gas adheres on the activated carbon there. When the purge control valve 54 is opened in accordance with a command from a computer (not shown) during operation of an engine (not shown), the evaporated fuel gas which has adhered on the activated carbon is released, is discharged into the intake pipe 57, and is burnt. The activated carbon is regenerated due to such release.

The pressure sensor 55 and the solenoid valve 56 are provided in order to check whether there is leakage in the passage for the evaporated gas or not. For example, when the purge control valve 54 and the solenoid valve 56 are closed at certain operational conditions, the passage for the evaporated gas is interrupted from outside. At the time, a part of the evaporated gas is introduced into the pressure sensor 55 through a nipple. The presence of the leakage in the passage can be detected by watching a change in output from the pressure sensor 55. The pressure sensor 55 has an atmospheric pressure sensor provided therein. When the pressure sensor is also utilized as an atmospheric pressure sensor (not shown) to be used for fuel control, the pressure sensor can measure an atmospheric pressure at the same time. A signal indicative of the measured atmospheric pressure can be forwarded to the computer (not shown) to be used for other control.

EMBODIMENT 3

The pressure sensor according to the present invention may be used to simultaneously measure an ambient atmospheric pressure and a hydraulic pressure such as an engine oil, a transmission oil, a power steering oil, a brake oil, a four wheel steering oil, a suspension oil, and a traction oil, in various kinds of hydraulic control for controlling an engine system, a driving system and a running system in an internal combustion engine.

EMBODIMENT 4

The pressure sensor according to the present invention may be used to simultaneously measure an ambient atmospheric pressure and a pressure of a refrigerant used in an air conditioner combined with an internal combustion engine.

EMBODIMENT 5

The pressure sensor according to the present invention may be used to simultaneously measure an ambient atmospheric pressure and a fuel pressure in an internal combustion engine such as a gasoline pressure in a gasoline supply passage in a gasoline engine, or a fuel injection pressure in a diesel engine.

EMBODIMENT 6

The pressure sensor according to the present invention may be used to simultaneously measure an ambient atmospheric pressure and a pressure in a cylinder in an internal combustion engine, such as a change in pressure in four strokes (induction stroke→compression stroke→power stroke→exhaust stroke) in a gasoline engine, and a pressure in a cylinder of a diesel engine.

EMBODIMENT 7

The pressure sensor according to the present invention may be used to simultaneously measure an ambient atmospheric pressure and a pressure in an exhaust gas recirculation (EGR) passage of an internal combustion engine, such as a pressure between an EGR valve and an intake manifold, and a pressure at the exhaust pipe side of the EGR valve.

EMBODIMENT 8

The pressure sensor according to the present invention may be used to measure a pressure in an exhaust pipe of an internal combustion engine and an ambient atmospheric pressure at the same time.

The second embodiment and its following embodiments as stated earlier can offer similar advantages to the first embodiment.

The pressure sensor according to the present invention stated earlier can have such a structure and a circuit that the sensor for detecting and measuring a first pressure (a certain pressure) can detect and measure a plurality of pressures without being limited to measurement of a single kind of pressure.

Obviously, numerous modifications and variations of the present invention are possible in light of the above teachings. It is therefore to be understood that within the scope of the appended claims, the invention may be practiced otherwise than as specifically described herein.

What is claimed is:

1. A pressure sensor comprising:

a first pressure sensor; and an atmospheric pressure sensor;

wherein each sensor has a respective pressure-sensitive element, and a respective amplifying circuit for amplifying a respective output signal from the respective pressure-sensitive element;

wherein the respective amplifying circuit for the first pressure sensor, and the respective pressure-sensitive element and the respective amplifying circuit for the atmospheric pressure sensor are provided on a single chip; and wherein the single chip is free of the respective pressure-sensitive element for the first pressure sensor.

2. A pressure sensor according to claim 1, wherein:

each respective amplifying circuit compensates for nonuniformity in characteristics of the respective pressure-sensitive element; and the nonuniformity in the characteristics is due to temperatures.

3. A pressure sensor according to claim 1, further comprising:

a substrate having a temperature compensating adjustment element for compensating for temperature-caused nonuniformities in characteristics of the respective pressure-sensitive element, the single chip being free of the temperature compensating adjustment element;

wherein the substrate is separated from the single chip by an interposed member that diminishes the influence of heat transfer on the single chip.

4. A pressure sensor according to claim 2, further comprising:

a substrate having a temperature compensating adjustment element for compensating for temperature-caused nonuniformities in characteristics of the respective pressure-sensitive element, the single chip being free of the temperature compensating adjustment element;

wherein the substrate is separated from the single chip by an interposed member that diminishes the influence of heat transfer on the single chip.

5. A chip for a pressure sensor, comprising:

a first circuit for amplifying an output signal corresponding to a certain detected pressure;

only one pressure-sensitive element; and a second circuit for amplifying an output signal from the pressure-sensitive element;

wherein the pressure-sensitive element detects an atmospheric pressure.

* * * * *